Dec. 18, 1956        A. W. RASMUSSEN ET AL        2,774,544
   CORN CRACKING APPARATUS WITH A YIELDINGLY MOUNTED
           ROLL FOR THE PASSAGE OF FOREIGN OBJECTS
Filed Aug. 21, 1953                         2 Sheets-Sheet 1
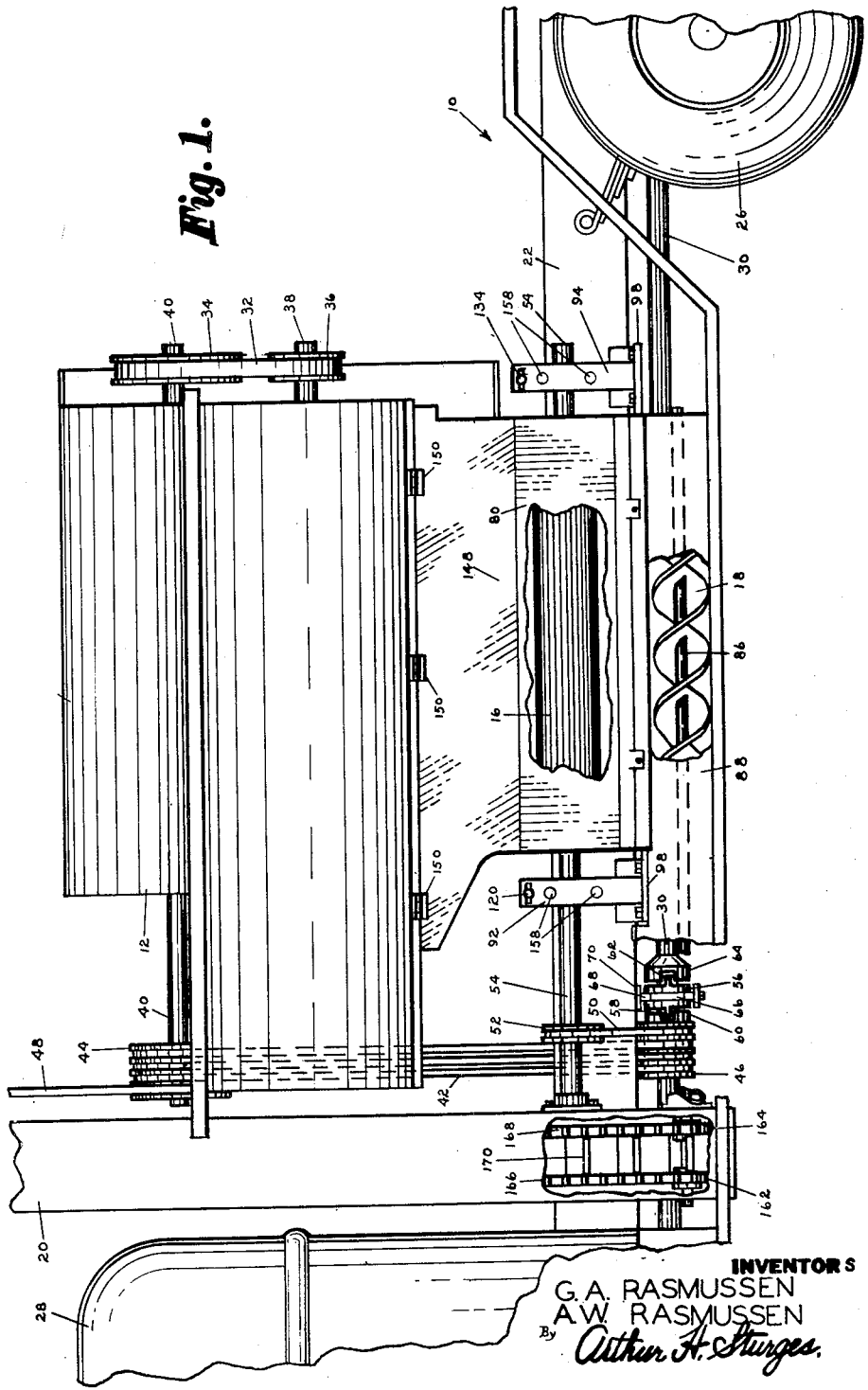
INVENTORS
G. A. RASMUSSEN
A. W. RASMUSSEN
By Arthur H. Sturges.
ATTORNEY Dec. 18, 1956  A. W. RASMUSSEN ET AL  2,774,544
CORN CRACKING APPARATUS WITH A YIELDINGLY MOUNTED
ROLL FOR THE PASSAGE OF FOREIGN OBJECTS
Filed Aug. 21, 1953  2 Sheets-Sheet 2
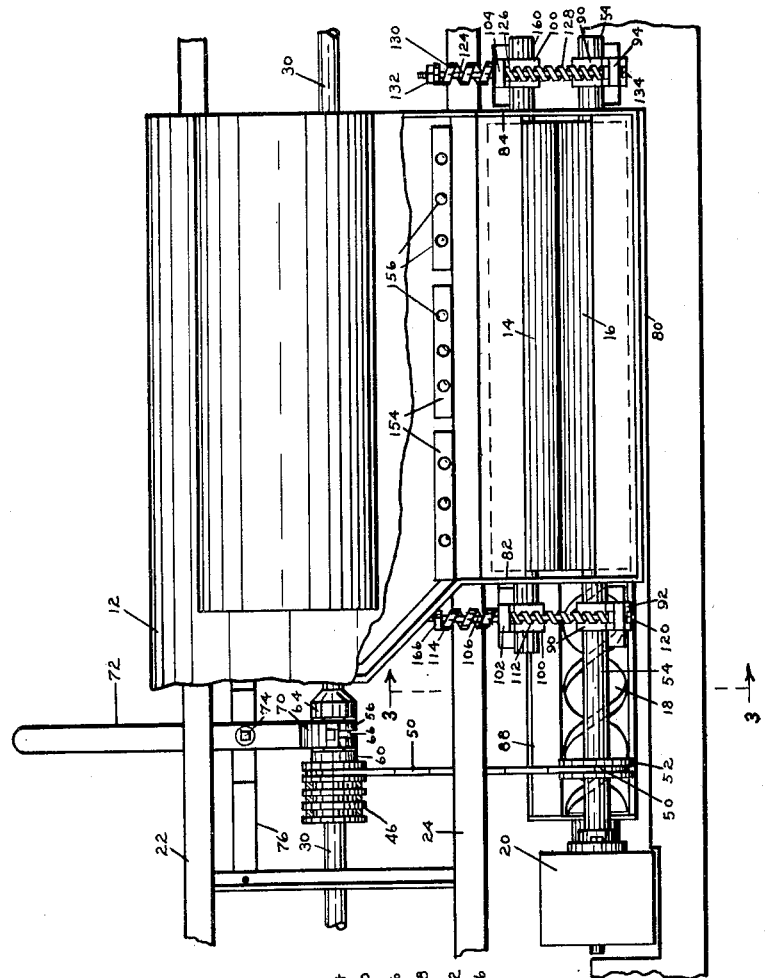
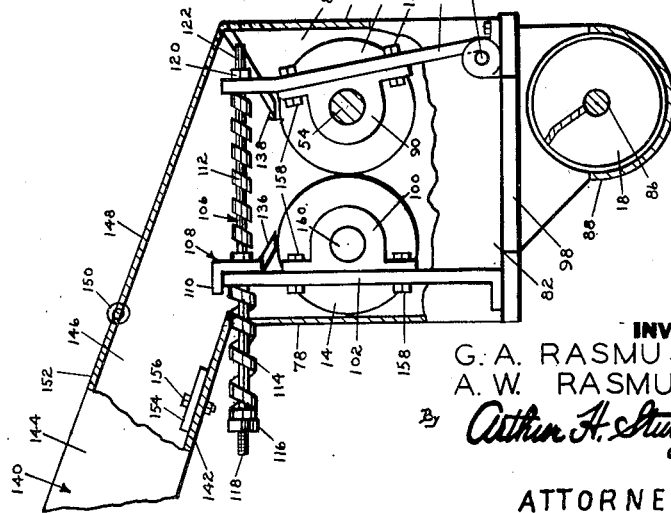
INVENTORS
G. A. RASMUSSEN.
A. W. RASMUSSEN
By Arthur H. Sturges.
ATTORNEY

United States Patent Office 2,774,544
Patented Dec. 18, 1956

2,774,544

CORN CRACKING APPARATUS WITH A YIELD-INGLY MOUNTED ROLL FOR THE PASSAGE OF FOREIGN OBJECTS

Arthur W. Rasmussen and George A. Rasmussen, Tekamah, Nebr.

Application August 21, 1953, Serial No. 375,635

3 Claims. (Cl. 241—232)

This invention relates to farm machinery and equipment particularly of the type used as attachments in combination with other equipment, such as trucks and tractors, and in particular corn cracking apparatus in combination with a corn sheller and adapted to be mounted on a truck and operated from the driving or transmission shaft thereof.

The purpose of this invention is to provide a corn cracking attachment for use in combination with a corn sheller, and that is adapted to be installed on the chassis of a truck and driven by the propelling or drive shaft thereof.

In the conventional method of cracking corn in appreciable quantities, such as at a mill, meal is produced and this meal can be mixed with the corn without spoiling as the meal becomes hot during the cracking of the corn, obviating spoilage during the cracking process. However, this meal in the cracked corn is objectionable as when fed to livestock forms dough-balls in the stomach of the animal or against the inner surfaces of the cheeks of the mouth of an animal, and as the livestock cannot digest the dough-balls the animal suffers and the health of the livestock is impaired.

With this thought in mind this invention contemplates an improved assembly of a corn sheller, a corn cracker, and a truck body wherein comparatively little meal remains with the cracked kernels of corn, and wherein the corn may be stored for an indefinite period of time without danger of spoilage.

The object of this invention is, therefore, to provide an improved combination of a corn sheller, a corn cracker, and a truck whereby the shelled corn is supplied to the corn cracker, and the sheller and cracker are actuated by the drive shaft of the truck.

Another object of the invention is to provide a corn cracker in which cracking rolls thereof are mounted with yielding elements which permit foreign objects, such as nails, bolts and the like, to pass through the rolls without damaging the ribs and ridges thereof.

Another important object of the invention is to provide a corn cracker in which cracking rolls are combined with a corn sheller and an elevator in which the cracked corn is fed from the cracking rolls to the elevator and in which all of the parts are driven from a common source.

A further object of the invention is to provide a corn cracker that is adapted to be installed in a passage from a corn sheller to an elevator wherein the corn is fed by gravity from the sheller to the cracker.

It is another object of this invention to provide conveying means between a corn sheller and a cracker in which magnets may be incorporated for pulling iron objects and other devices having magnetic attraction from the kernels of corn as they pass from the sheller to the cracker.

A still further object of the invention is to provide an assembly of a corn sheller, a corn cracker, an elevator, and a truck, in which the parts are actuated by the drive shaft of the truck, and in which the device is of a simple and economical construction.

With these and other objects and advantages in view the invention embodies a truck body having side beams, a cab, and wheels driven by a propeller or drive shaft, a corn sheller suspended above the side beams, a corn cracker positioned to receive kernels of corn from the sheller, an elevator, a conveyor for carrying cracked corn from the cracker to the elevator, and means for driving the parts from the drive shaft of the truck.

Other features and advantages of the invention will appear from the following description taken in connection with the drawings, wherein:

Figure 1 is a side elevational view with parts broken away showing the corn sheller and cracker mounted on a truck body or chassis.

Figure 2 is a plan view of the corn sheller and cracker assembly, also with parts broken away to show the interior construction thereof.

Figure 3 is a cross section, particularly through the corn cracking elements of the machine, taken on line 3—3 of Figure 2, and with the parts shown on an enlarged scale.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

Referring now to the drawings for a more particular description in which like numerals of reference designate like or corresponding parts throughout the several views, the chassis of a truck, parts of which are shown in Figure 1, is indicated by the numeral 10, and the assembly is mounted on the chassis.

The improved corn cracker assembly of this invention includes a conventional corn sheller, as indicated by the numeral 12, corn cracking rolls 14 and 16, a screw conveyor 18, and an elevator 20.

The truck chassis 10 is provided with side beams 22 and 24, wheels 26, a cab 28, and a propeller or drive shaft 30. The corn sheller 12 is mounted on the side beams 22 and 24, as shown in Figures 1 and 2, and elements thereof are driven by a belt 32 which is trained over pulleys 34 and 36, the pulley 36 being positioned on a shaft 38 and the pulley 34 being mounted on a shaft 40 which is driven from the drive shaft 30 with belts 42. The belts 42 are trained over a multiple pulley 44 on the shaft 40 and a similar pulley 46 on the drive shaft 30 whereby the corn sheller is actuated directly from the drive shaft.

A belt 48 also extends from the pulley 44 upwardly to the head shaft of the elevator 20, and another belt 50 extends from the pulley 46 to a pulley 52 on a shaft 54 of the outer cracking roll 16, whereby the cracking rolls are also driven directly from the drive shaft.

The multiple pulley 46 on the drive shaft 30 is connected to the drive shaft with a clutch having a sliding collar 56 having lugs 58 on one side that mesh with grooves in a hub 60 of the pulley 46, and lugs 62 on the opposite side that mesh with slots in a stationary collar 64 on the drive shaft, whereby with the sliding clutch collar in one position the pulley 46 rotates freely on the drive shaft and with the collar in the opposite position the pulley is rotated by the drive shaft.

The clutch collar 56 is provided with an annular groove 66 into which pins 68 of a yoke 70 on the end of a clutch lever 72 extend, and with the lever pivotally mounted by a bolt 74 on a strut 76 of the truck chassis the clutch may readily be shifted to disengage the operating parts of the assembly from the drive shaft, or to engage the parts with the shaft for operation of the assembly, as may be desired.

The cracking rolls 14 and 16 are positioned in an elongated housing having side walls 78 and 80, and end walls 82 and 84, and the screw conveyor 18, which is mounted on a shaft 86 is positioned in a trough or hopper 88 extended downwardly from the housing.

The shaft 54 of the outer cracking roll 16 is journaled in bearings 90 on upwardly extended floating bars 92 and 94 which are pivotally mounted with pins 96 on one side of the lower frame 98 of the cracking roll housing. The inner roll 14 is journaled in bearings 100 on stationary bars 102 and 104 which are secured, preferably by welding, to the frame 98, and with the cracking rolls mounted in this manner ribs and grooves on and in the peripheral surfaces thereof are positioned to crack kernels of corn supplied to the rolls from the sheller.

A rod 106 at one end of the housing extends freely through openings in the upper ends of the bars 92 and 102 and, as shown in Figure 3, the rod 106 is provided with a lug 108 which is welded to the rod and with the lug positioned to engage the bar 102 it provides a stop limiting movement of the rod through the bar. The upper part of the lug 108 is provided with a flange 110 that rests upon the upper end of the bar, thereby preventing the rod turning as the nuts are adjusted.

The rod 106 is provided with an inner spring 112, that is positioned between the bars 92 and 102, and an outer spring 114, the compressive strength of which is greater than that of the spring 112. The spring 114 is positioned between the bar 102 and a nut 116 on a threaded end 118 of the rod 106, and with the opposite end of the rod held by a nut 120 on the threaded end 122, the rolls are urged together by the spring 114, with the smaller spring 112 retaining the rolls in operative positions.

The opposite ends of the cracking rolls are held in a similar manner with a rod 124 extended freely through the upper ends of the bars 94 and 104, and with the rod provided with a flanged stop lug 126 and springs 128 and 130, similar to the springs 112 and 114, respectively. The end of the rod 124 on which the spring 130 is positioned is provided with a nut 132, and a nut 134 similar to the nut 120, is provided on the opposite end.

The upper part of the cracking roll housing is provided with baffles 136 and 138 which guide the kernels to the cracking rolls, and the upper end of the housing is connected to a chute 140, having a base plate 142, side walls 144 and 146, a lower cover plate 148 pivotally mounted on the chute with a hinge 150, and an upper cover plate 152, which is also connected with the hinge 150, to the chute.

The base plate 142 is provided with longitudinally disposed magnets 154 which are secured in position by bolts 156, and with the magnets as shown in Figure 3 foreign matter, such as nails, bolts, and the like will be drawn from the kernels of corn passing from the sheller to the cracking rolls.

As shown in Figure 3, the bearings 90 and 100 of the cracking rolls 16 and 14, respectively, are secured to the vertically disposed bars with bolts 158, and the roll 14 is provided with a shaft 160, by which it is journaled in the bearings. It will also be noted that the shaft 86 of the screw conveyor or auger 18, which is broken away in Figure 1, extends into the boot or lower end of the elevator 20 and sprockets 162 and 164 over which the chains 166 and 168 of the elevator are trained, are mounted on the shaft. The endless chains 166 and 168 are provided with flights or buckets 170.

With the parts assembled as illustrated and described the corn sheller and cracker are mounted on a body or frame of a truck with the parts positioned whereby kernels of corn from the sheller, which is conventional, slide downwardly through the chute 140, over the magnets 154, which remove foreign articles having magnetic attraction, and through the baffles 136 and 138 to the cracking rolls, which by means of the vertically disposed mounting bars, are adapted to yield or separate should a bolt or the like pass therethrough. From the cracking rolls the kernels drop into the screw conveyor by which they are fed to the lower end of the elevator 20, which carries the kernels upwardly so that they may be directed by chutes and the like to a wagon or truck.

From the foregoing specification it will become apparent that the invention disclosed will adequately accomplish the functions for which it has been designed and in an economical manner, and that its simplicity, accuracy, and ease of operation, are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and arrangement of details and parts such as come within the purview of the invention claimed may be resorted to in actual practice, if desired.

Having now described the invention that which is claimed to be new and desired to be procured by Letters Patent, is:

1. In a corn cracker assembly, the combination which comprises a housing having a base frame, spaced parallel stationary bars secured to and extended upwardly from one side of the base frame, similar spaced parallel floating bars hinged to the side of the base frame opposite to the side in which the stationary bars are positioned and extended upwardly therefrom, a pair of horizontally disposed cracking rolls positioned in the housing, means journaling one of said rolls on the stationary bars, means journaling the other of said rolls on the floating bars, rods having springs thereon extending freely through openings in the upper ends of the bars, each of said rods being positioned to extend through the opening of one of the stationary bars and also through the opening of one of the floating bars, said springs being positioned between the stationary and floating bars and also on ends of the rods extended from the stationary bars, the said springs on the extended ends of the rods having greater compressive strength than the springs positioned between the bars, means for adjusting the tension of the springs, a hopper positioned to receive corn from the cracking rolls, and conveying means in said hopper.

2. In a grain cracker, the combination which comprises an elongated housing having a base frame in the lower part, spaced vertically disposed parallel stationary bars having openings in the upper ends mounted on said base frame and positioned in one side of the housing, spaced vertically disposed floating bars also having openings in the upper ends pivotally mounted on the base frame and positioned with the openings thereof aligned with the openings of the stationary bars, a pair of cracking rolls positioned in the housing, means for rotatably mounting one of said rolls on the stationary bars, means for rotatably mounting the other of said rolls on the floating bars, rods freely mounted in the openings in the upper ends of the stationary bars and extended laterally therefrom, the ends of the rods at one side of the stationary bars extending freely through the openings in the upper ends of the floating bars, springs on the portions of the rods positioned between the stationary and floating bars, springs on ends of the rods extending from the sides of the stationary bars opposite to the sides on which the floating bars are positioned, the springs on the extending ends of the rods having greater tension than the springs between the bars, nuts threaded on the ends of the rods for adjusting the tension of the springs, and an elongated hopper positioned below the rolls for receiving the cracked grain.

3. In a grain cracker, the combination which comprises an elongated housing having a base frame in the lower part, spaced vertically disposed parallel stationary bars having openings in the upper ends mounted on said base frame and positioned in one side of the housing, spaced vertically disposed floating bars also having openings in the upper ends pivotally mounted on the base frame and positioned with the openings thereof aligned with the openings of the stationary bars, a pair of cracking rolls positioned in the housing, means for rotatably mounting one of said rolls on the stationary bars, means for rotatably mounting the other of said rolls on the floating bars, rods extending freely through the openings in the upper ends of the bars, angulated anchoring means fixedly positioned on said rods and abutting the sides and tops of the stationary bars for preventing rotation of the rods, small springs positioned on the portions of the rods between the stationary and floating bars, large springs on ends of the rods extending from sides of the stationary bars opposite to the sides from which the ends extending through the floating bars extend, nuts threaded on the ends of the rods for adjusting tension of the springs, a hopper positioned below the cracking rolls, and conveying means in said hopper.

References Cited in the file of this patent

UNITED STATES PATENTS

| | | |
|---|---|---|
| 456,506 | Faulkner | July 21, 1891 |
| 571,266 | Favrow | Nov. 10, 1896 |
| 662,350 | Bussells | Nov. 20, 1900 |
| 1,724,876 | Holbeck | Aug. 13, 1929 |
| 2,141,647 | Frerotte | Dec. 27, 1938 |
| 2,392,365 | Carter | Jan. 8, 1946 |

FOREIGN PATENTS

| | | |
|---|---|---|
| 721,481 | France | Dec. 22, 1931 |
| 846,199 | Germany | Aug. 14, 1952 |

OTHER REFERENCES

"Food Industries," September 1933, pp. 360–362.